(12) United States Patent
Yoshiga

(10) Patent No.: US 8,264,440 B2
(45) Date of Patent: Sep. 11, 2012

(54) DISPLAY DEVICE, ELECTRONIC APPARATUS AND ELECTRONIC SYSTEM

(75) Inventor: Masahiro Yoshiga, Hyogo (JP)

(73) Assignee: Chimei Innolux Corporation, Chu-Nan (TW)

( * ) Notice: Subject to any disclaimer, the term of this patent is extended or adjusted under 35 U.S.C. 154(b) by 588 days.

(21) Appl. No.: 12/539,419

(22) Filed: Aug. 11, 2009

(65) Prior Publication Data

US 2010/0039419 A1 Feb. 18, 2010

(30) Foreign Application Priority Data

Aug. 12, 2008 (JP) .................................. 2008-207895

(51) Int. Cl.
*G09G 3/36* (2006.01)

(52) U.S. Cl. .......................................... 345/92; 345/100

(58) Field of Classification Search ..................... 345/92, 345/98, 100

See application file for complete search history.

(56) References Cited

U.S. PATENT DOCUMENTS 8,035,596 B2 * 10/2011 Sekine ............................ 345/92

2006/0007218 A1 * 1/2006 Miyake et al. .................. 345/92
2007/0001205 A1 * 1/2007 Kimura ............................ 345/92
2008/0055292 A1 * 3/2008 Do et al. .......................... 345/92

FOREIGN PATENT DOCUMENTS

CN 1467699 1/2004
JP 2001-059957 3/2001

* cited by examiner

*Primary Examiner* — Kevin M Nguyen
(74) *Attorney, Agent, or Firm* — Liu & Liu

(57) ABSTRACT

Disclosed is a display device having a pixel electrode and a pixel driving transistor. The display device comprises a capacitor, a gate voltage control transistor and a source driving circuit. The capacitor, coupled to the gate of the pixel driving transistor, holds the applied voltage to the aforesaid gate. The gate voltage control transistor has a drain coupled to a connection point between the gate of the pixel driving transistor and the capacitor, a source coupled to the source bus line and a gate coupled to the gate line, for controlling the applied voltage of the capacitor. The source driving circuit utilizes the adjacent source bus lines to alternately switch the voltage held by the capacitor among several different high voltages and several different low voltages to drive the source.

5 Claims, 16 Drawing Sheets

DISPLAY DEVICE, ELECTRONIC APPARATUS AND ELECTRONIC SYSTEM

BACKGROUND

1. Field

The present invention generally relates to an LCD device, an electronic apparatus and an electronic system, and more particularly to an LCD device having a pixel electrode and a pixel driving transistor.

2. Description of Prior Art

With advantages of lightweight and low electricity power consumption, LCD devices are used as monitors for the electronic apparatus such as a computer or a mobile phone. In an active matrix display device which employs the thin film transistors (TFT) for applying voltages to the pixels electrodes, the TFTs are positioned between the data lines and the pixels electrodes. The gate lines are utilized to switch the aforesaid TFTs and provide the voltages which are applied to data lines to the pixels electrodes as disclosed in Japan Patent Publication No. 2007-188079.

For extending the service lifespan of the LCD device, the applied voltages between the pixel electrodes and the common electrode are inverted for each frame to force the voltages applied to the liquid crystals to be inverted correspondingly in the LCD device. Meanwhile, non-inverted and inverted voltages can be applied to the scan lines in one frame to control the liquid crystals not to be merely twisted toward a single direction.

Please refer to FIG. 16, which shows waveforms of gate line driving method of an embodiment according to prior arts. FIG. 16(A) shows waveforms of a first liquid crystal driving status and FIG. 16(B) shows waveforms of a second liquid crystal driving status. The solid lines represent gate voltages Vg, Vg'. The dotted lines represent source voltages Vs. Vs'. The one-dot chain lines represent drain voltages Vd, Vd'. The two-dot chain lines represent a common voltage Vcom applied to a common electrode.

In the gate line driving method of the prior arts as shown in FIG. 16, the gate voltage Vg is unrelated to the first liquid crystal driving status or the second liquid crystal driving status but a fixed value. Therefore, when the gate voltage Vg becomes the base voltage Vgl as the TFT is turned off in the first liquid crystal driving status as shown in FIG. 16(A), the voltage difference between the base voltage Vgl of the gate voltage Vg and the drain voltage Vd is 2.3V. However, in the second liquid crystal driving status shown in FIG. 16(B), the voltage difference between the base voltage Vgl' of the gate voltage Vg' and the base voltage Vsl' of the source voltage Vs' is increased up to 7.5V. Consequently, the difference of the off-status currents Ioff of the TFT exists between the first liquid crystal driving status and the second liquid crystal driving status. Significantly, the difference of the off-status currents Ioff between the first liquid crystal driving status and the second liquid crystal driving status is one of the reasons causing the picture quality deterioration and causing a flicker phenomenon on the screen.

SUMMARY

The disclosure is directed to an LCD device, an electronic apparatus and an electronic system capable of reducing the flicker.

The LCD device of an embodiment has a pixel electrode and a pixel driving transistor. The drain of the pixel driving transistor is coupled to the pixel electrode, and the source of the pixel driving transistor is coupled to a source bus. The pixel driving transistor controls a voltage applied to the pixel electrode corresponding to a gate voltage applied to the gate of the pixel driving transistor. The LCD device of an embodiment comprises a capacitor, a gate voltage control transistor and a source driving circuit. The capacitor is coupled to the gate of the pixel driving transistor and holds the voltage at the gate of the pixel driving transistor. The drain of the gate voltage control transistor is coupled to a connection point between the gate of the pixel driving transistor and the capacitor, the source of the control transistor is coupled to the source bus and the gate of the control transistor is coupled to a gate line. The gate voltage control transistor is used for controlling the voltage applied to the capacitor. The source driving circuit utilizes adjacent source bus lines to alternately switch the voltages held by the capacitor among several different high voltages and several different low voltages to drive the source of the pixel driving transistor.

Moreover, the source driving circuit of an embodiment further comprises a multiplexer, a first high voltage source, a second high voltage source, a first low voltage source, a second low voltage source, a voltage selecting circuit and a voltage switching circuit. The multiplexer provides a source voltage of the pixel electrode to the source bus. The first high voltage source generates a first high level voltage. The second high voltage source generates a second high level voltage that is higher than the first high level voltage. The first low voltage source generates a first low level voltage that is lower than the first and second high level voltages. The second low voltage source generates a second low level voltage that is lower than the first low level voltage. The voltage selecting circuit selectively outputs one of the first high level voltage and the second high level voltage to a first output line, and outputs one of the first low level voltage and the second low level voltage to a second output line according to a selection signal. The voltage switching circuit provides the voltages outputted by the first output line and the second output line to the source bus when the voltage applied to the capacitor is held and alternately provides the outputs of the multiplexer to the source bus when the source voltage is applied to the source of the pixel driving transistor.

In addition, the voltage selecting circuit of an embodiment further comprises a first voltage level selecting unit, a second voltage level selecting unit, a third voltage level selecting unit and a fourth voltage level selecting unit. The first voltage level selecting unit outputs the first high level voltage or the second high level voltage, the first low level voltage or the second low level voltage according to a voltage level selecting signal. The second voltage level selecting unit outputs the second high level voltage or the first high level voltage, the second low level voltage or the first low level voltage according to the voltage level selecting signal. The third voltage level selecting unit outputs either the first high level voltage or the second high level voltage, as well as either the first low level voltage or the second low level voltage from the first voltage selecting unit to first source bus lines according to a source bus switching signal. The fourth voltage level selecting unit outputs either the second high level voltage or the first high level voltage, as well as either the second low level voltage or the first low level voltage from the second voltage selecting unit to second source bus lines adjacent to the first source bus lines according to the source bus switching signal. The first and second source bus lines are alternatively arranged.

According to some embodiments, the LCD device has a pixel electrode and a pixel driving transistor. The pixel driving transistor has a drain thereof coupled to the pixel electrode, a source thereof coupled to a source bus to control a voltage applied to the pixel electrode according to the gate voltage applied to a gate of the pixel driving transistor. By using the design of some embodiments, the alteration of the voltages between the gate and the source of the gate voltage control transistor or the alteration of the voltage between the gate and the drain of the aforesaid gate voltage control transistor can be diminished. Therefore, alteration of the voltage applied to the drain of the pixel driving transistor can be diminished accordingly to reduce the flicker. In the aforesaid design, the capacitor is coupled to the gate of the pixel driving transistor to hold the voltage at the gate of the pixel driving transistor, the drain of the control transistor is coupled to a connection point between the gate of the pixel driving transistor and the capacitor, the source of the control transistor is coupled to the source bus and the gate of the control transistor is coupled to the gate line to control the voltage applied to the capacitor; furthermore, the source driving circuit utilizes adjacent source bus lines to alternately switch the voltages held by the capacitor among several different high voltages and several different low voltages to drive the source of the pixel driving transistor.

DETAILED DESCRIPTION

Figure 1:
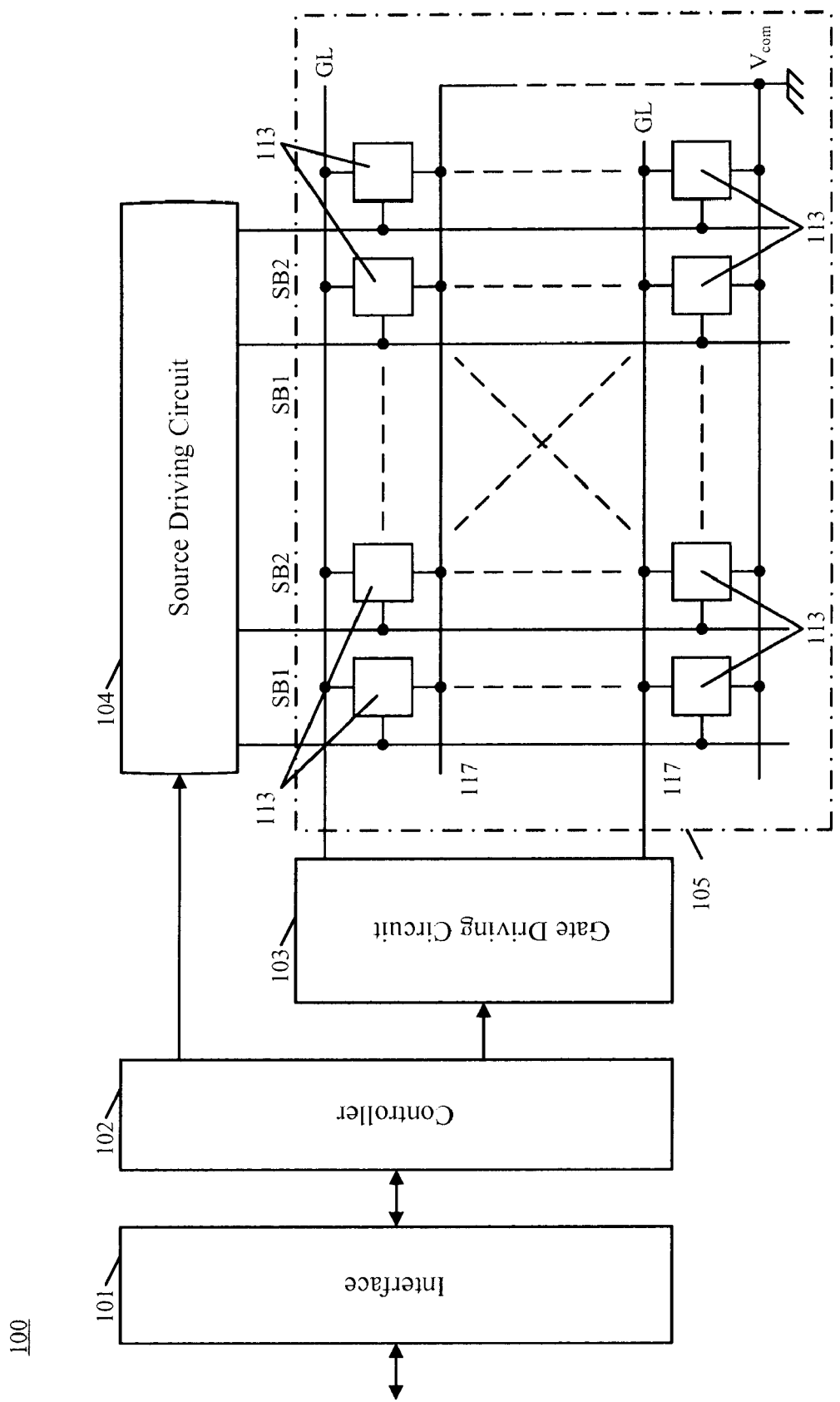
FIG. 1 is a functional diagram showing a system of an embodiment according to the present invention.

Please refer to FIG. 1, which is a functional diagram showing a system of an embodiment according to the present invention. An LCD device 100 is described as an embodiment for explaining the present invention accordingly. For example, the LCD device 100 can be an active matrix display device. The active matrix display device comprises an interface 101, a controller 102, a gate driving circuit 103, a source driving circuit 104 and a display unit 105. The interface 101 is coupled with an interface of a host control device of the LCD device 100 to receive display data therefrom. The controller 102 generates control signals for the display unit 105 according to the display data received via the interface 101. And then, the controller 102 provides the aforesaid control signals to the gate driving circuit 103 and the source driving circuit 104.

The gate driving circuit 103 generates gate driving signals for driving the gate lines GL of the display unit 105 according to the control signals from the controller 102 and provides the gate driving signals to the display unit 105. The source driving circuit 104 generates source driving signals for driving first source bus lines SB1 and second source bus lines SB2 of the display unit 105 according to the control signals from the controller 102 and provides the source driving signals to the display unit 105.

Figure 2:
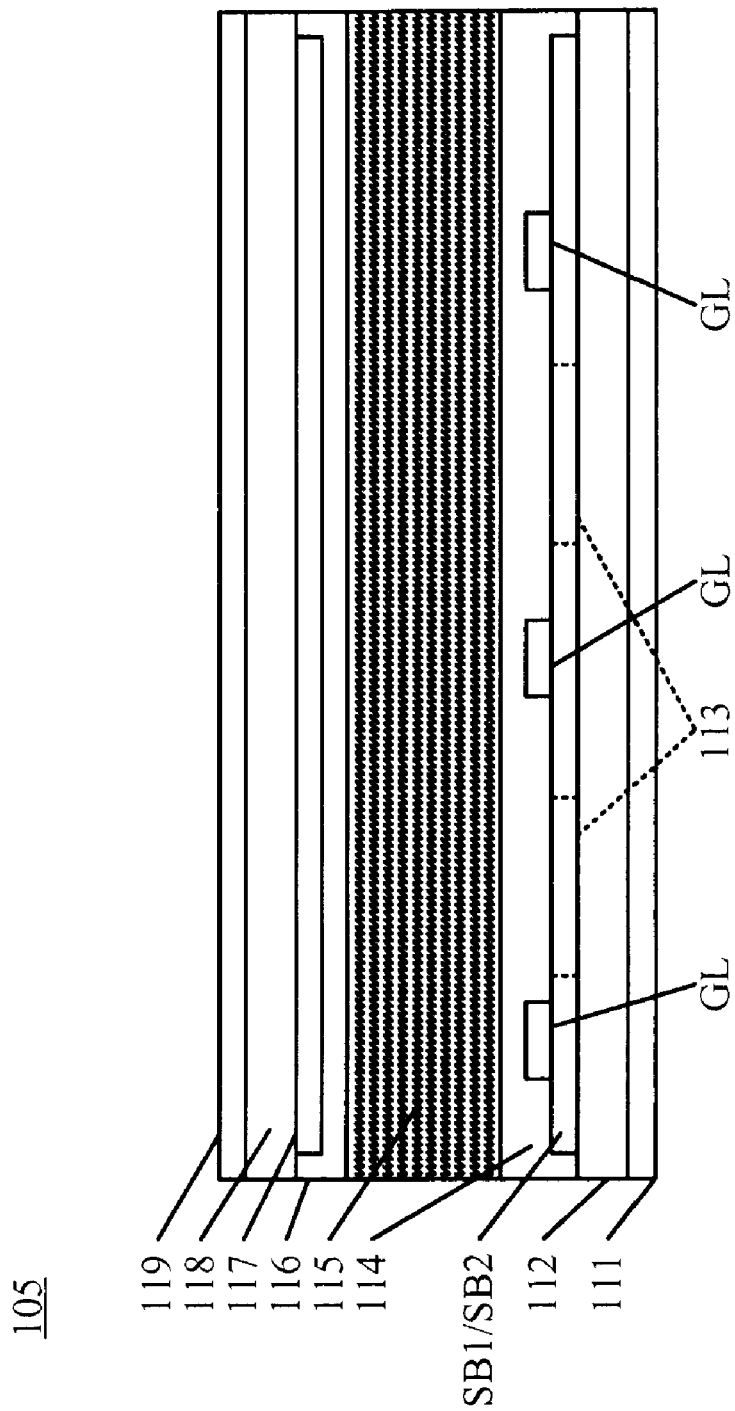
FIG. 2 depicts a diagram showing major components of the display unit 105.

Please refer to FIG. 2, which depicts a diagram showing major components of the display unit 105. The display unit 105 comprises a polarizing plate 111, a bottom glass substrate 112, pixel electrode portions 113, gate lines GL, first source bus lines SB1, second source bus lines SB2, an alignment layer 114, liquid crystals 115, an alignment layer 116, a common electrode 117 (common lines CL), a top glass substrate 118 and a polarizing plate 119. The polarizing plate 111 is positioned under the bottom glass substrate 112 to allow a specific polarized light component of the light from the back light module to penetrate the bottom glass substrate 112, for example. The gate lines GL, the first source bus lines SB1, the second source bus lines SB2, and the pixel electrode portions 113 are formed above the bottom glass substrate 112. The gate lines GL are coupled with the gate driving circuit 103 shown in FIG. 1 to receive the gate driving signals therefrom.

The first source bus lines SB1 and the second source bus lines SB2 are aligned perpendicular to the gate lines GL. Meanwhile the first source bus lines SB1 and the second source bus lines SB2 are isolated from the gate lines GL and coupled with the source driving circuit 104. Furthermore, the first source bus lines SB1 and the second source bus lines SB2 are arranged alternately. The pixel electrode portions 113 are located between the gate lines GL and also between the first, second source bus lines SB1, SB2. Meanwhile, the pixel electrode portions 113 are coupled with the gate lines GL and the first, second source bus lines SB1, SB2. The alignment layer 114 is formed above the gate lines GL, the first, second source bus lines SB1, SB2 and the pixel electrode portions 113. The alignment layer 114 is employed for forcing the liquid crystals 115 to align in a specific direction. The top glass substrate 118 is positioned above the alignment layer 114 with spacers (not shown) sandwiched therebetween. The common electrode 117 is positioned on the opposite surface of the top glass substrate 118 with respect to the surface toward the alignment layer 114. The common electrode 117 is applied with a reference voltage, e.g. a GND voltage.

The alignment layer 116 is formed on a surface (i.e. the bottom surface as shown in FIG. 2) of the common electrode 117 and the common electrode 117 is attached to the top glass substrate 118. The alignment layer 116 is employed for forcing the liquid crystals 115 to align in a specific direction. The aligning directions of the alignment layer 114 and the alignment layer 116 can be parallel or perpendicular to each other. Moreover, the polarizing plate 119 is positioned on the surface of the top glass substrate 118 with respect to the surface toward the liquid crystals 115. The polarizing plate 119 allows a specific polarized light component of the light to penetrate the top glass substrate 118 therethrough.

Figure 3:
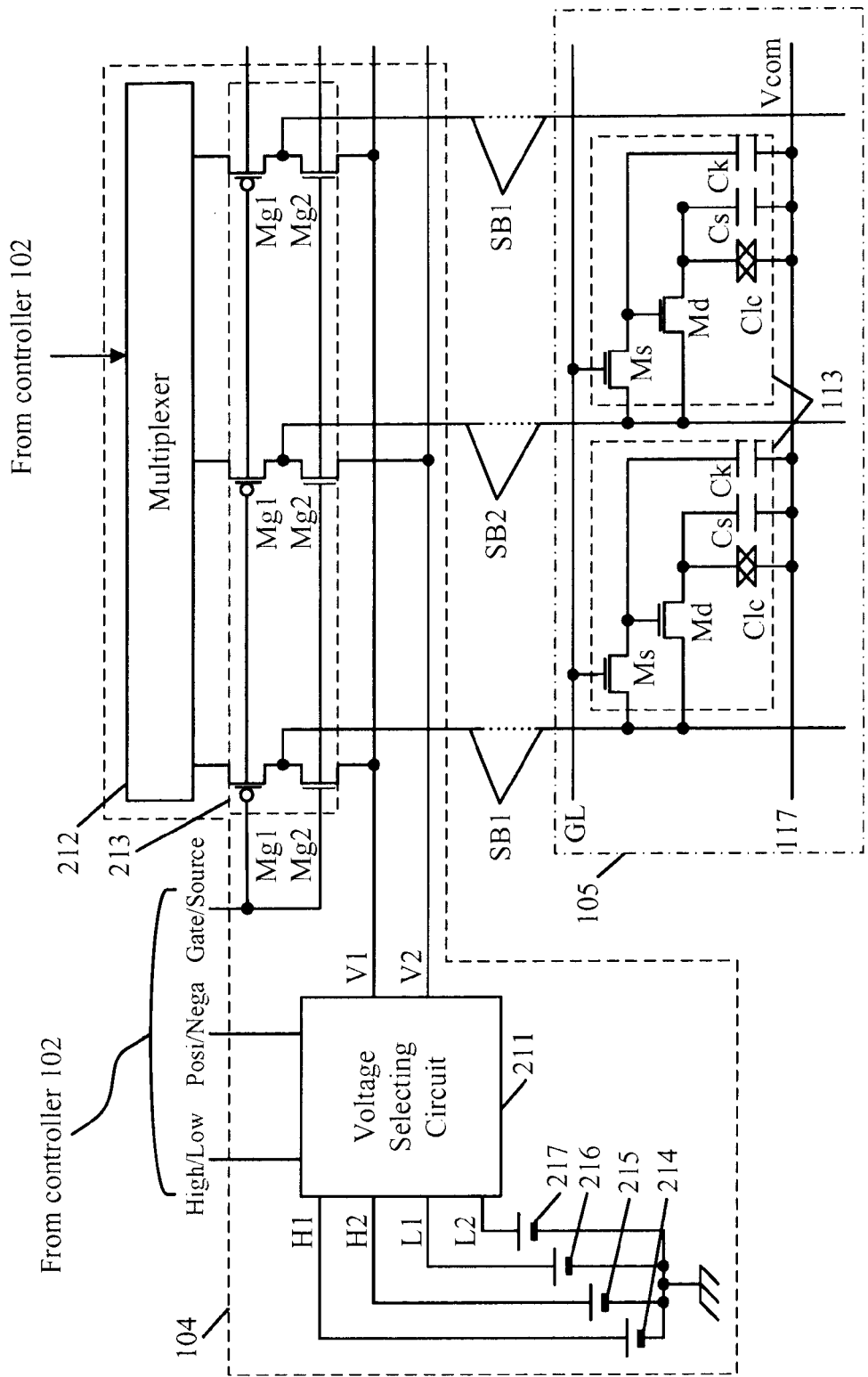
FIG. 3 depicts a block diagram of the source bus driving circuit 104.

Then, please refer to FIG. 3, which depicts a block diagram of the source bus driving circuit 104. The source bus driving circuit 104 comprises a voltage selecting circuit 211, a multiplexer 212, a voltage switching circuit 213, a first high voltage source 214, a second high voltage source 215, a first low voltage source 216 and a second low voltage source 217. Moreover, the voltage selecting circuit 211, the first high voltage source 214, the second high voltage source 215, the first low voltage source 216 and the second low voltage source 217 constitute a holding voltage switching circuit for the gate voltage applied to the pixel driving transistor.

The first high voltage source 214 generates a first high level voltage H1. The second high voltage source 215 generates a second high level voltage 112. The first low voltage source 216 generates a first low level voltage L1. The second low voltage source generates a second low level voltage L2. The first high level voltage H1, the second high level voltage H2, the first low level voltage L1, and the second low level voltage L2 respectively generated by the first high voltage source 214, the second high voltage source 215, the first low voltage source 216 and the second low voltage source 217 are provided to the voltage selecting circuit 211. The magnitudes of the first high level voltage 111, the second high level voltage H2, the first low level voltage L1 and the second low level voltage L2 are such that H2>H1>L1>L2.

The voltage selecting circuit 211 determines to output one of the first high level voltage and the second high level voltage as a first output voltage V1, and determines to output one of the first low level voltage and the second low level voltage as a second output voltage V2, according to a driving voltage level indicating signal high/low and a bus indicating signal posi/nega provided by the controller 102.

Figure 4:
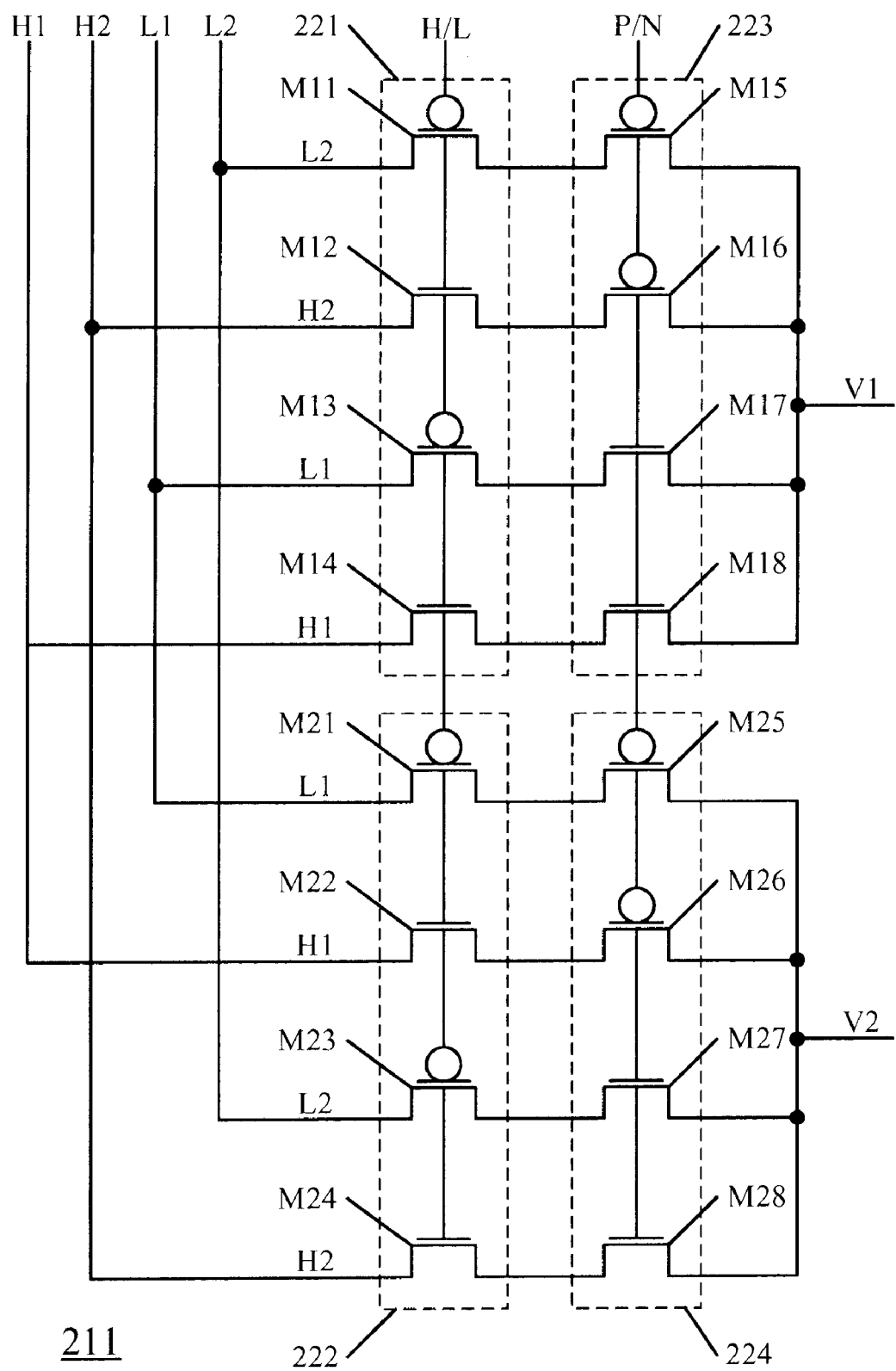
FIG. 4 depicts a circuit diagram of the voltage selecting circuit 211.

Please refer to FIG. 4, which depicts a circuit diagram of the voltage selecting circuit 211. The voltage selecting circuit 211 comprises a first voltage level selecting unit 221, a second voltage level selecting unit 222, a third voltage level selecting unit 223 and a fourth voltage level selecting unit 224. The first voltage level selecting unit 221 comprises transistors M11~M14. The first voltage level selecting unit 221 outputs one of the first high level voltage H1 and the second high level voltage H2, as well as one of the first low level voltage L1 and the second low level voltage L2, according to a driving voltage level indicating signal high/low provided by the controller 102. The second voltage level selecting unit 222 comprises transistors M21~M24. The second voltage level selecting unit 222 outputs one of the second high level voltage 112 and the first high level voltage H1, as well as one of the second low level voltage L2 and the first low level voltage L1, according to the driving level indicating signal high/low provided by the controller 102.

The third voltage level-selecting unit 223 comprises transistors M15~M18. The third voltage level selecting unit 223 outputs either the first high level voltage H1 or the second high level voltage 112, also either the first low level voltage L1 or the second low level voltage L2 selected by the first voltage level selecting unit 221 as the first output voltage V1, according to a bus indicating signal posi/nega provided by the controller 102. The fourth voltage level-selecting unit 224 comprises transistor M25~M28. The fourth voltage level selecting unit 224 outputs either the second high level voltage H2 or the first high level voltage H1, also either the second low level voltage L2 or the first low level voltage L1 selected by the second voltage level selecting unit 222 as the second output voltage V2 according to the bus indicating signal posi/nega provided by the controller 102. The first output voltage V1 and the second output voltage V2 outputted by the voltage selecting circuit 211 are provided to the voltage switching circuit 213. The multiplexer 212 generates and provides the source voltages to the voltage switching circuit 213 according to the control signals provided by the controller 102.

The voltage switching circuit 213 comprises transistors Mg1, Mg2 provided for each source bus line. The voltage switching circuit 213 provides one of the first output voltage V1, the second output voltage V2 and the output voltage from the multiplexer 212 to the first source bus lines SB1 and the second source bus lines SB2, according to the switching signals gate/source (source bus switching signal) from the controller 102. The first source bus lines SB1 and the second source bus lines SB2 are coupled to the pixel electrode portions 113.

The following is an explanation about the pixel electrode portions 113 mentioned above. Each pixel electrode portion 113 comprises a pixel driving transistor Md, a gate voltage control transistor Ms, and an equivalent circuit of capacitors Clc, Cs, Ck. The source of the gate voltage control transistor Ms is coupled with the first source bus line SB1 or the second source bus line SB2. The drain of the gate voltage control transistor Ms is coupled with the capacitor Ck, which is used for holding the gate voltage applied to the pixel driving transistor Md. The gate of the gate voltage control transistor Ms is coupled with the gate line GL. The gate voltage control transistor Ms is turned on so that the capacitor Ck can hold the gate driving voltage.

The pixel driving transistor Md is a thin film transistor. The source of the pixel driving transistor Md is coupled with the first source bus line SB1 or the second source bus line SB2. The drain of the pixel driving transistor Md is coupled with the capacitor Clc. The gate of pixel driving transistor Md is coupled to a connection point between the drain of the gate voltage control transistor Ms and the capacitor Ck, which is used for holding the gate voltage. The capacitor Clc is brought about by the liquid crystals 115 between the pixel electrode (not shown in figure) and common electrode 117. Besides, the capacitor Cs is an auxiliary capacitor. The pixel electrode (not shown) can be a transparent electrode. The pixel driving transistor Md is turned on by the voltage held by the capacitor Ck, which is used for holding the gate voltage. Then, the current can be introduced from the first, second source bus lines SB1, SB2 and applied to the pixel electrode (not shown).

The following is an explanation about the source driving circuit 104. Please refer to FIG. 5, which shows a block circuit diagram of the display device in an initial status according to an embodiment. The driving voltage level indicating signals high/low and the bus indicating signals posi/nega are at low level LL. The switching signals gate/source are at high level HH. The output voltage of the multiplexer 212 to the first source bus lines SB1 is indicated as Vsn. The output voltage of the multiplexer 212 to the second source bus lines SB2 is indicated as Vsp.

When the driving voltage level indicating signals high/low and the bus indicating signals posi/nega are at a low level, the first output voltage V1 of the voltage selecting circuit 211 becomes at the second low level voltage L2. The second output voltage V2 of the voltage selecting circuit 211 becomes at the first low level voltage L1. Meanwhile, when the switching signals gate/source are at high level HH, the transistors Mg1 are turned off and the transistors Mg2 are turned on to provide the first output voltage V1 to the first source bus lines SB1 and provide the second output voltage V2 to the second source bus lines SB2. Therefore, the second low level voltage L2 is applied to the first source bus lines SB1 and the first low level voltage L1 is applied to the second source bus lines SB2.

The gate voltage control transistor Ms and the pixel driving transistor Md of the pixel electrode portions 113 are turned off because the gate line GL becomes at low level. The voltage about the second low level voltage L2 is applied to the capacitor Ck and the voltage about the source voltage Vsn is applied to the capacitors Clc, Ck. And then, the capacitor Ck holds the gate voltage.

Figure 6:
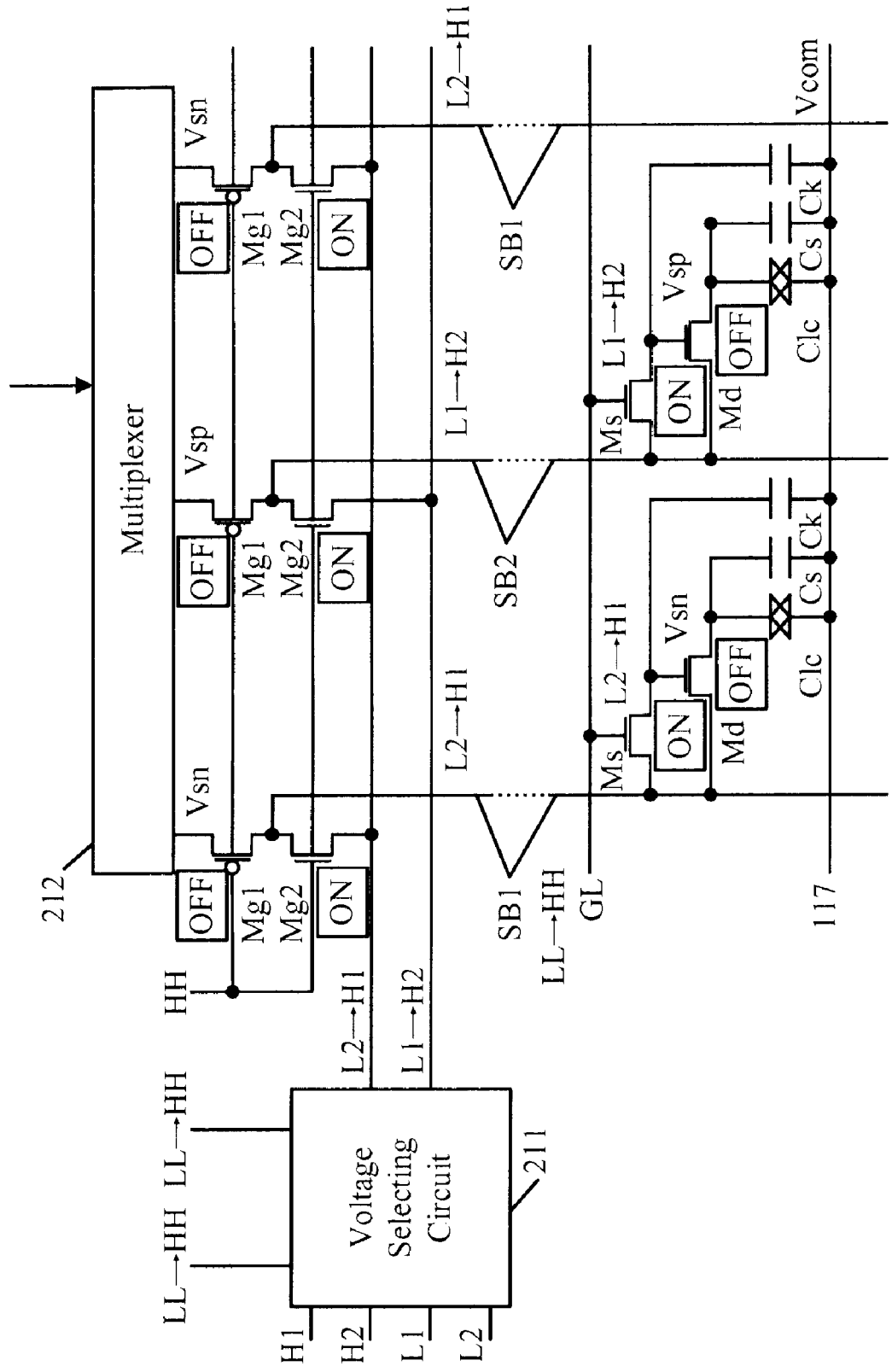
FIG. 6 shows a block circuit diagram of the display device when the gate voltage is held according to the present invention.

Please refer to FIG. 6, which shows a block circuit diagram of the display device when the gate voltage is held according to an embodiment. When the gate voltage is held by the capacitors Ck, both the driving voltage level indicating signals high/low and the bus indicating signals posi/nega change from low level LL to high level HH. Therefore, the first output voltage V1 of the voltage selecting circuit 211 changes from the second low level voltage L2 to the first high level voltage H1. The second output voltage V2 changes from the first low level voltage L1 to the second high level voltage H2.

Therefore, the voltage level of the first source bus lines SB1 are changed from the second low level voltage L2 to the first high level voltage H1. The voltage level of the second source bus lines SB2 are changed from the first low level voltage L1 to the second high level voltage H2.

Furthermore, the voltage levels of the gate lines are changed from the low level LL to high level HH. Accordingly, the gate voltage control transistors Ms are turned on. In the pixel electrode portions 113 which are coupled with the first source bus lines SB1, the capacitors Ck are held at the first high level voltage H1. In the pixel electrode portions 113 which are coupled with the second source bus lines SB2, the capacitors Ck are held at the second high level voltage H2.

Figure 7:
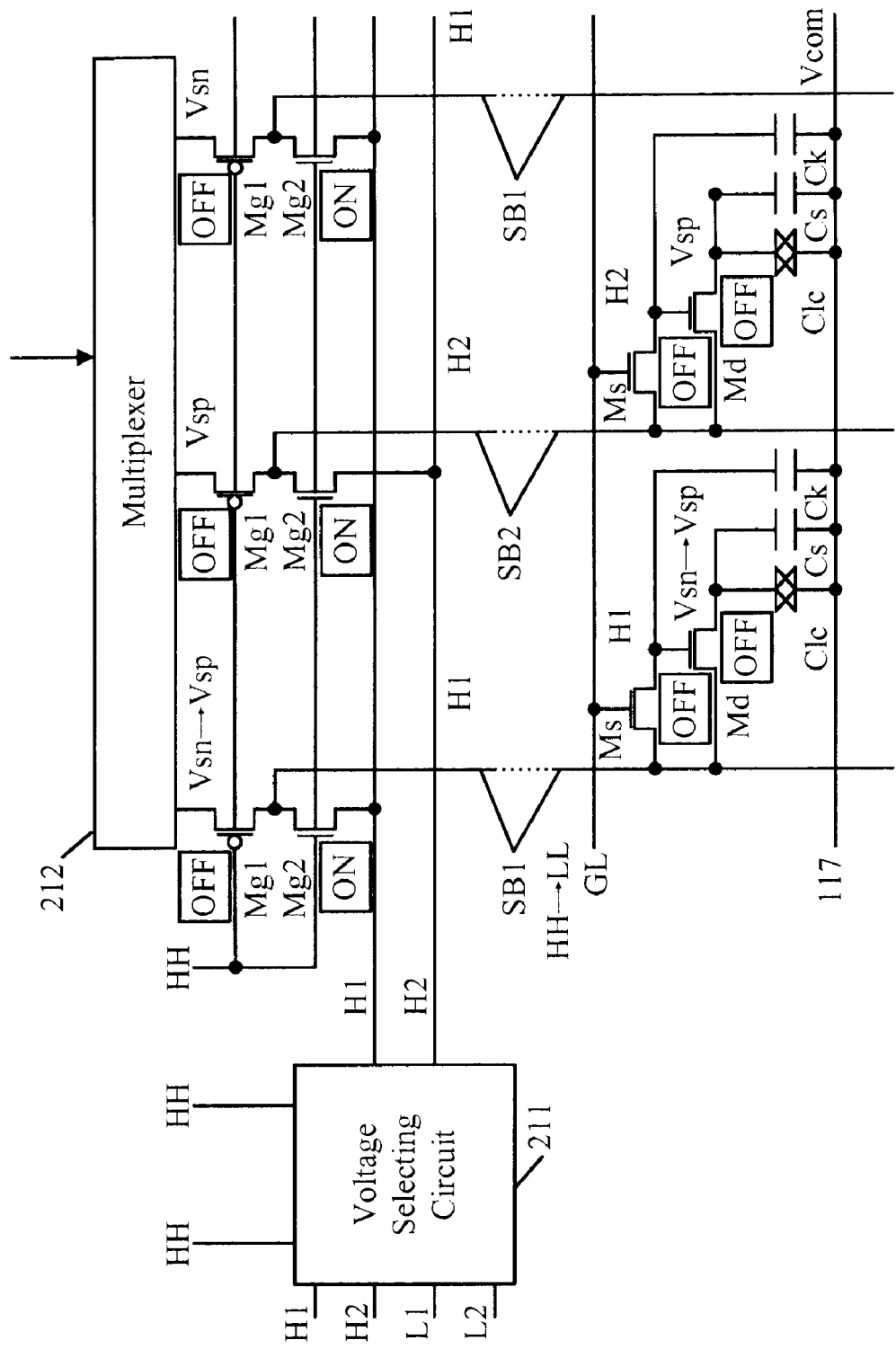
FIG. 7 shows a block circuit diagram of the display device when the gates are opened (turned off) according to the present invention.

Next, the gate voltage control transistors Ms are turned off. Please refer to FIG. 7, which shows a block circuit diagram of the display device when the gates are turned off according to an embodiment. As shown in FIG. 7, the voltage levels of the gate lines GL are changed from high level HH to low level LL. When the gate lines GL become at low level LL, the gate voltage control transistors Ms are turned off. The capacitors Ck are disconnected from the first source bus lines SB1 and the second source bus lines SB2 and hold the first high level voltage H1 and the second high level voltage H2 respectively. With the output voltages of the multiplexer 212, a write operation is executed to the capacitors Clc, Cs in the pixel electrode portions 113 which are coupled with the first source bus lines SB1.

Figure 8:
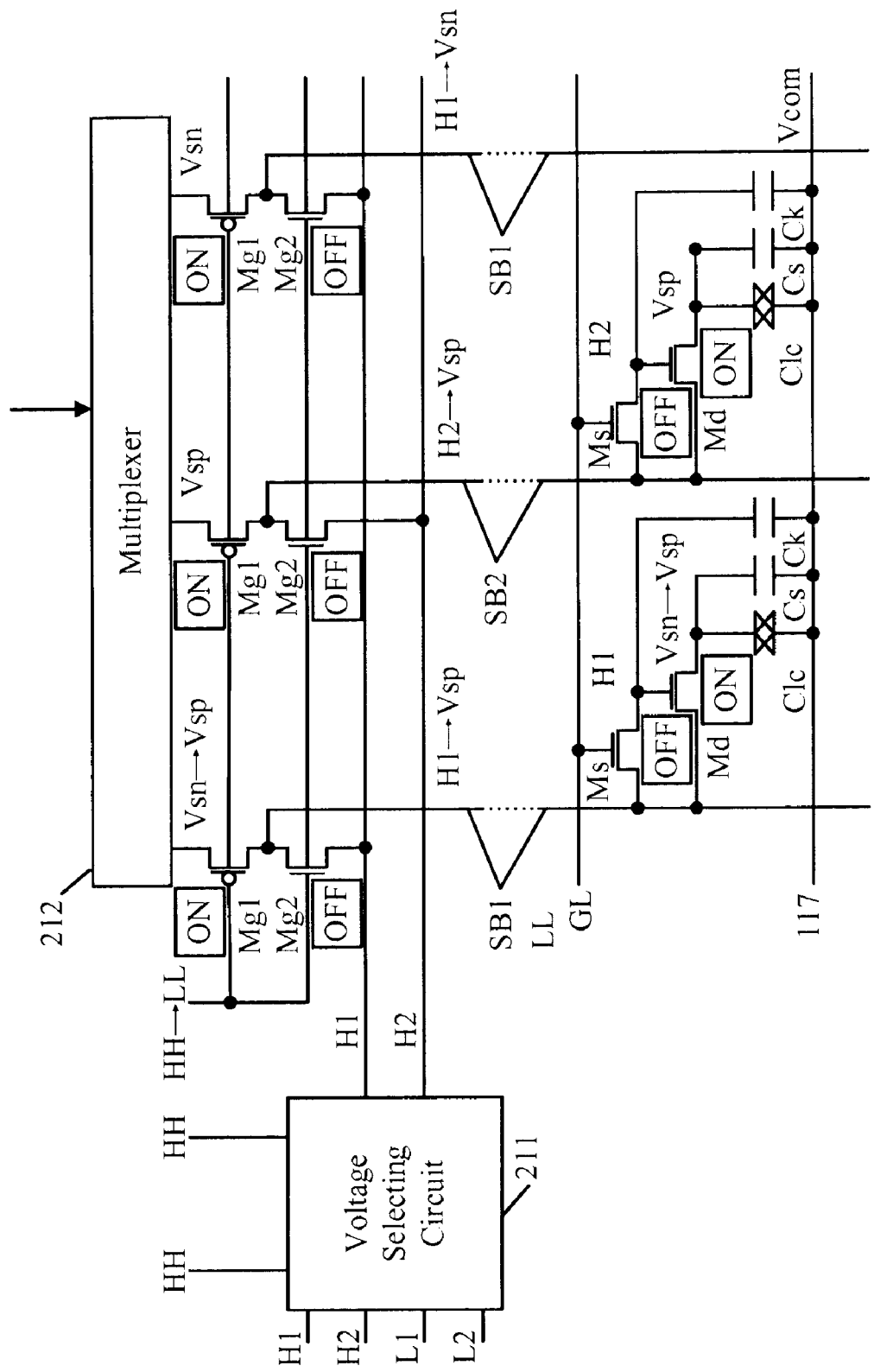
FIG. 8 shows a block circuit diagram of the display device during executing the write operation according to the present invention.
Figure 9:
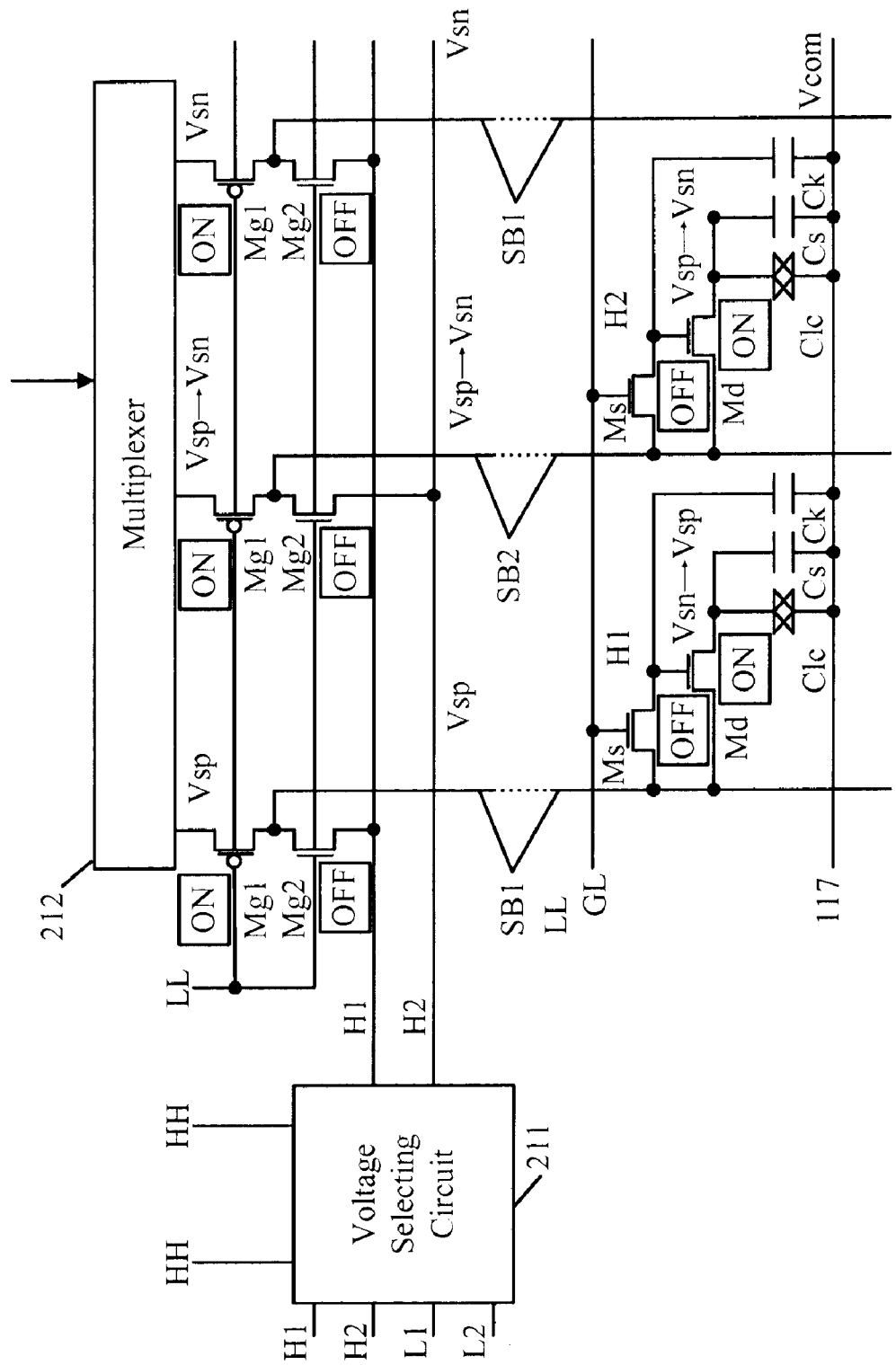
FIG. 9 shows a block circuit diagram of the display device during executing the write operation according to the present invention.
Figure 10:
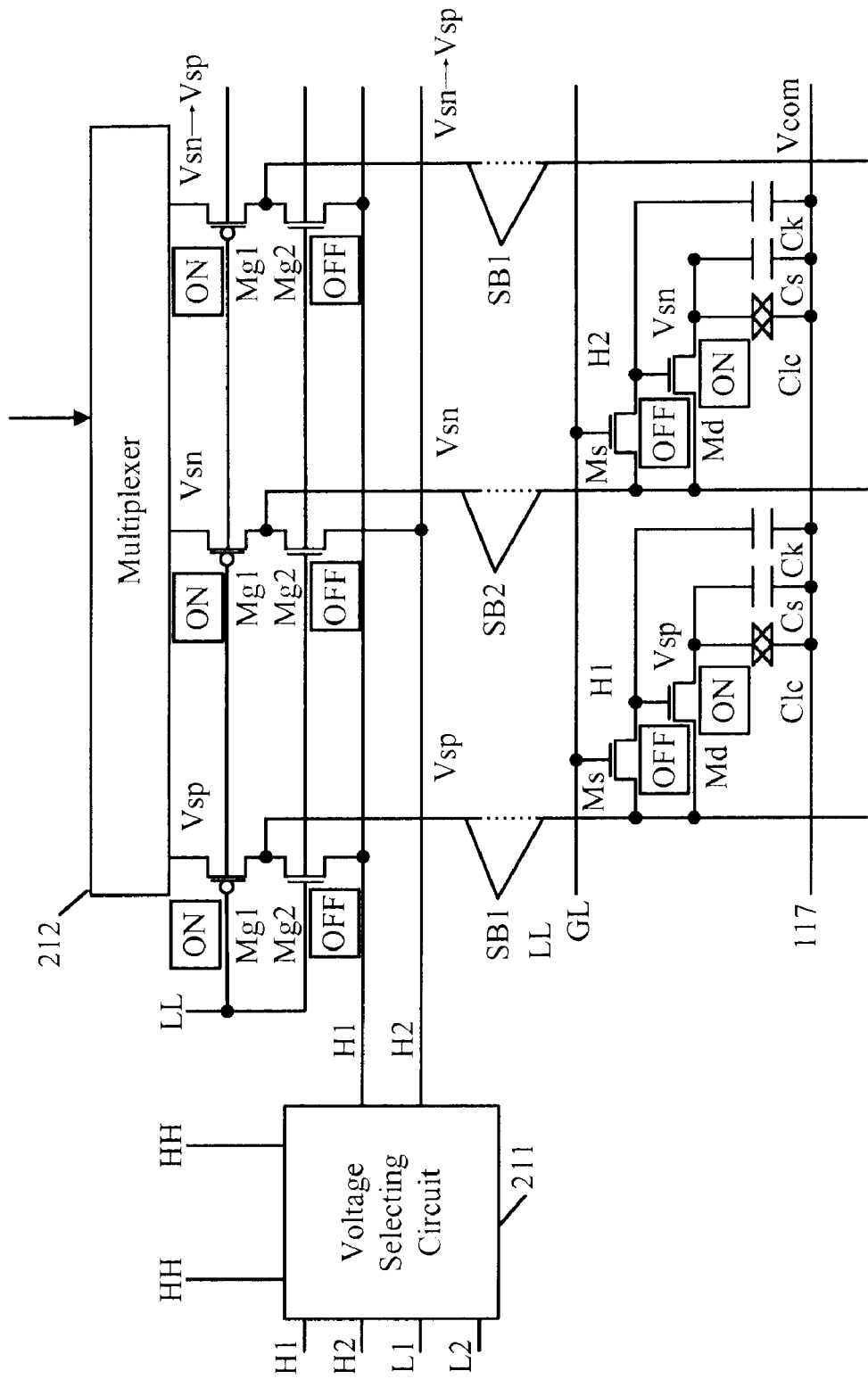
FIG. 10 shows a block circuit diagram of the display device during executing the write operation according to the present invention.
Figure 11:
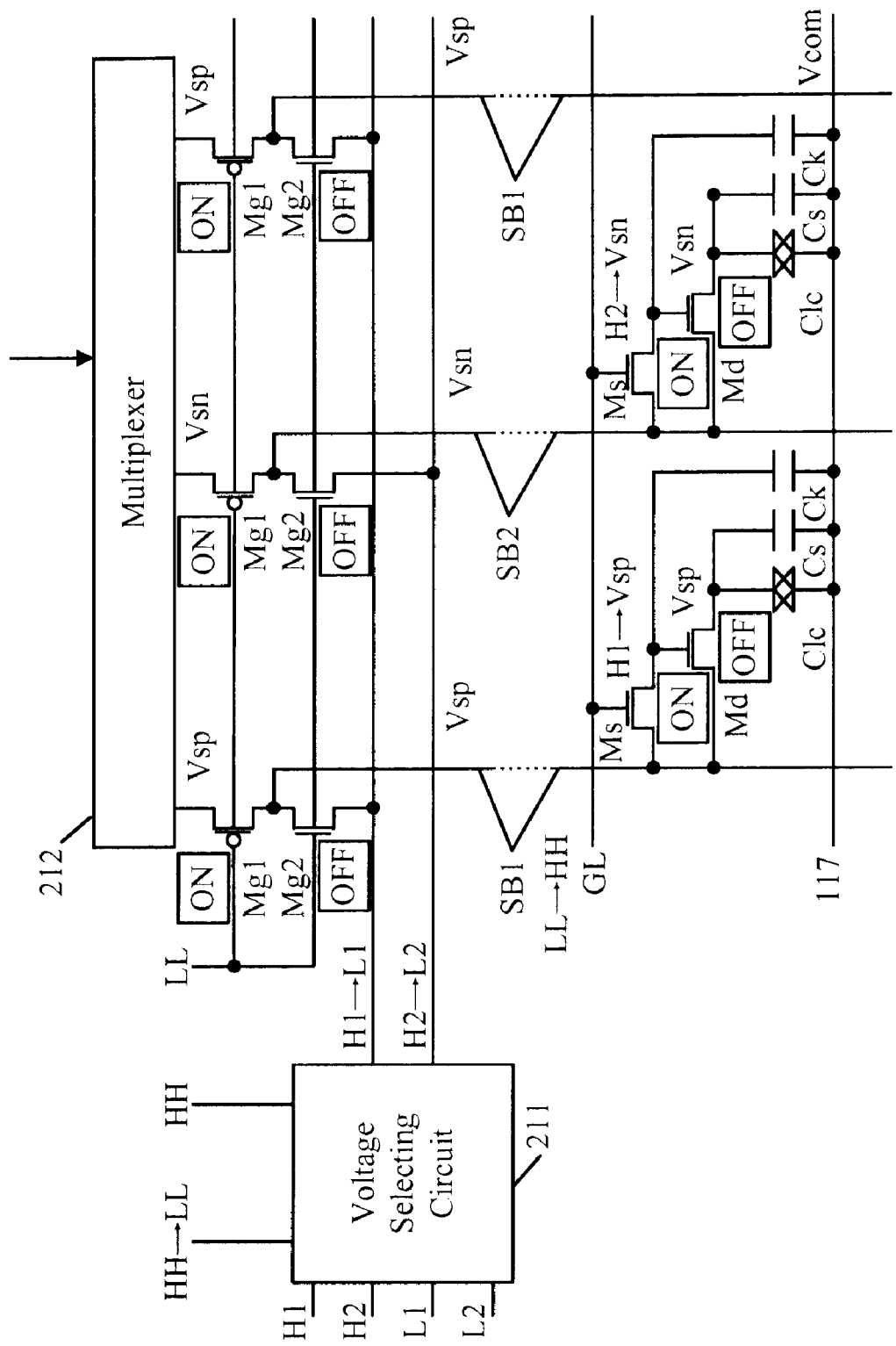
FIG. 11 shows a block circuit diagram of the display device when the write operation is finished according to the present invention.

FIG. 8 to FIG. 10 show block circuit diagrams of the display device executing the write operation according to an embodiment. FIG. 8 shows the status of the display device when the output voltage of the multiplexer 212 to the first source bus lines SB1 is changed from Vsn to Vsp. FIG. 9 shows the status of the display device when the voltage levels of the switching signals gate/source change from high level HH to low level LL. FIG. 10 shows status of the display device when the pixel driving transistors Md are turned on.

Initially, for example, the output voltage of the multiplexer 212 to the first source bus lines SB1 is changed from Vsn to Vsp as shown in FIG. 8. At that moment, the voltage levels of the switching signals gate/sources change from high level HH to low level LL as shown in FIG. 9, consequently, the transistors Mg1 are turned on and the transistors Mg2 are turned off. The output voltages of the multiplexer 212 are provided to the first source bus lines SB1 and the second source bus lines SB2. The input voltages of the first source bus lines SB1 and the second source bus lines SB2 are changed from the first, second high level voltage H1, H2 to the output voltages Vsn, Vsp from the multiplexer 212.

Because the input voltages of the first source bus lines SB1 and the second source bus lines SB2 are changed from the first, second high level voltage H1, H2 to the output voltages Vsp, Vsn from the multiplexer 212 as aforementioned, the pixel driving transistors Md are turned on by the first, second high level voltage H1, H2 held by the capacitors Ck.

As shown in FIG. 10, the pixel driving transistors Md are turned on. The output voltages Vsp, Vsn from the multiplexer 212 are written into the capacitors Clc, Cs in the pixel electrode portions 113 which are coupled with the first source bus lines SB1 and the second source bus lines SB2. The aforesaid operations are repeated to execute the write operations to the pixels. Then, the gate voltage control transistors Ms are turned on and the pixel driving transistors Md are turned off to finish the write operations to the pixels.

Please refer to FIG. 1, which shows a block circuit diagram of the display device when the write operation is finished according to an embodiment. The controller 102 shown in FIG. 3 changes the voltage levels of the gate lines GL from low level LL to high level HH. Therefore, the gate voltage control transistors Ms are turned on. The output voltages Vsp, Vsn from the multiplexer 212 are applied to the capacitors Ck through the first source bus lines SB1 and the second source bus lines SB2. The gate voltages of the pixel driving transistors Md become the output voltages Vsp, Vsn from the multiplexer 212 and then are turned off.

Moreover, the controller 102 changes the voltage levels of the driving level indicating signals high/low from high level HH to low level LL. Therefore, the first output voltage V1 of the voltage selecting circuit 211 changes from the first high level voltage H1 to the first low level voltage L1. The second output voltage V2 changes from the second high level voltage H2 to the second low level voltage L2. Then, the voltages applied to the capacitors Ck becomes at low level according to the output voltages determined by the voltage selecting circuit 211.

Figure 12:
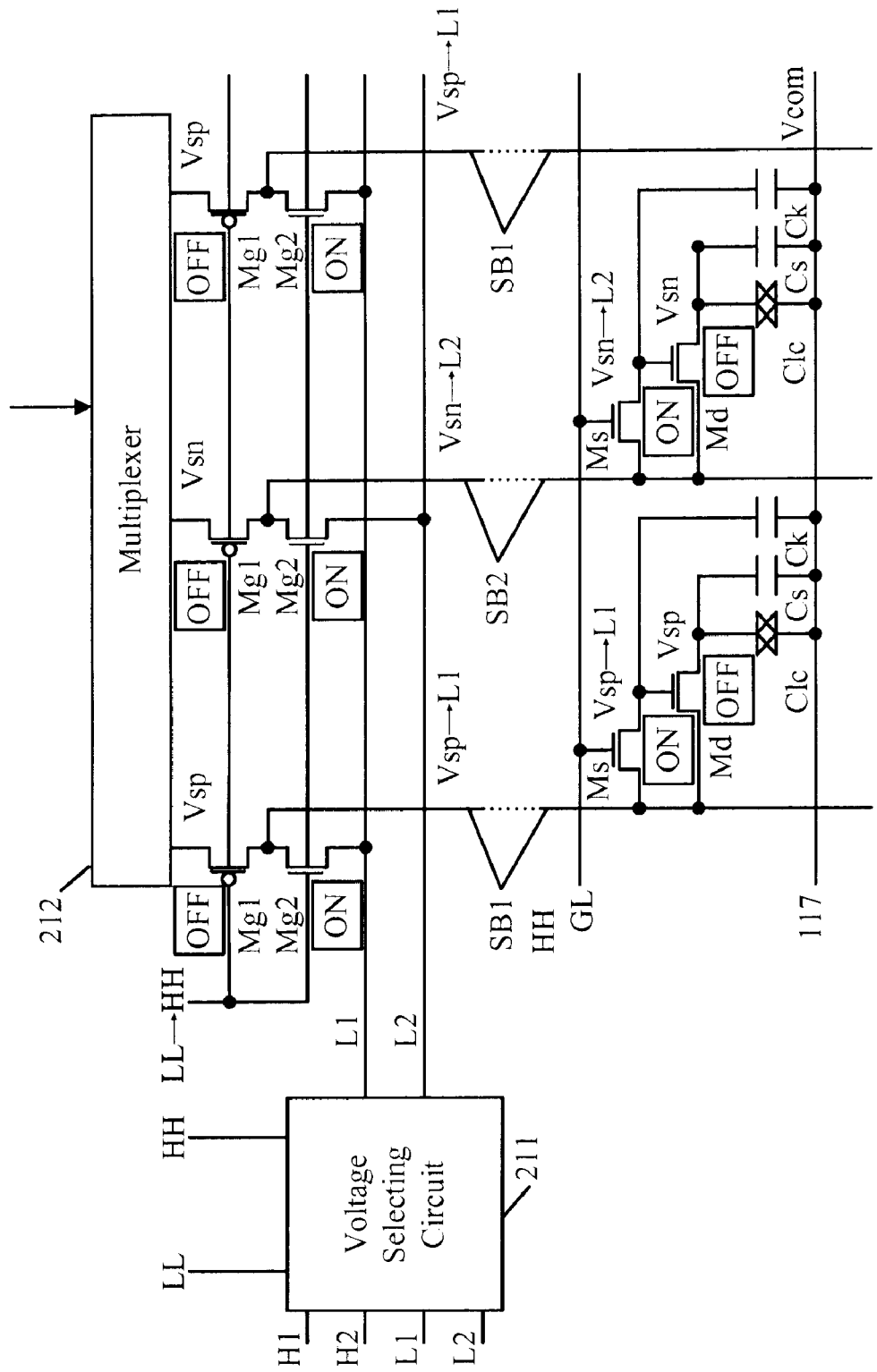
FIG. 12 shows a block circuit diagram of the display device when the voltages applied to the capacitors Ck becomes low level according to the present invention.

Please refer to FIG. 12, which shows a block circuit diagram of the display device when the voltages applied to the capacitors Ck becomes at low level according to an embodiment. The controller 102 shown in FIG. 3 changes the voltage levels of the switching signals gate/source from low level LL to high level HH. Because the voltage levels of the switching signals gate/source are changed from low level LL to high level HH, the transistors Mg1 are turned off and the transistors Mg2 are turned on. The first output voltage V1 of the voltage selecting circuit 211 is applied to the first source bus lines SB1 and the second output voltage V2 of the voltage selecting circuit 211 is applied to the second source bus lines SB2. At this moment, the first output voltage V1 becomes the first low level voltage L1 and the second output voltage V2 becomes the second low level voltage L2. The first source bus lines SB1 is applied with the first low level voltage L1 and the second source bus lines SB2 is applied with the second low level voltage L2.

Meanwhile, the gate voltage control transistors Ms are turned on with the gate lines GL at high level. The capacitors Ck in the pixel electrode portions 113 which are coupled with the first source bus lines SB1 become at the first low level voltage L1. The capacitors Ck in the pixel electrode portions 113 which are coupled with the second source bus lines SB2 become at the second low level voltage L2.

Figure 13:
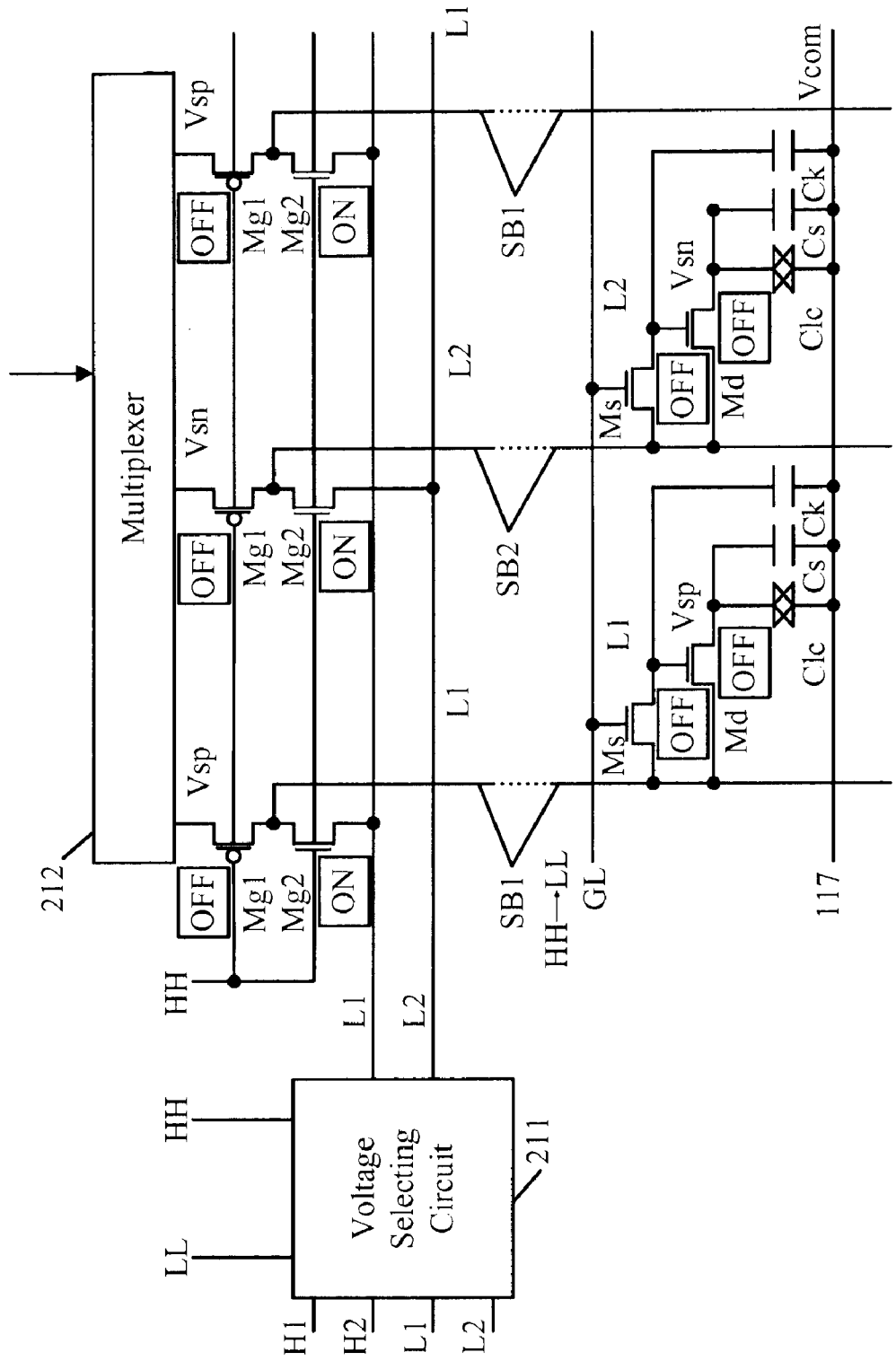
FIG. 13 shows a block circuit diagram of the display device recovered back to the initial status according to the present invention.

Next, the explanation about recovering the display device back to the initial status is presented. Please refer to FIG. 13, which shows a block circuit diagram of the display device recovered back to the initial status according to an embodiment. The controller 102 shown in FIG. 3 changes the voltage levels of the gate lines GL from high level HH to low level LL.

Figure 5:
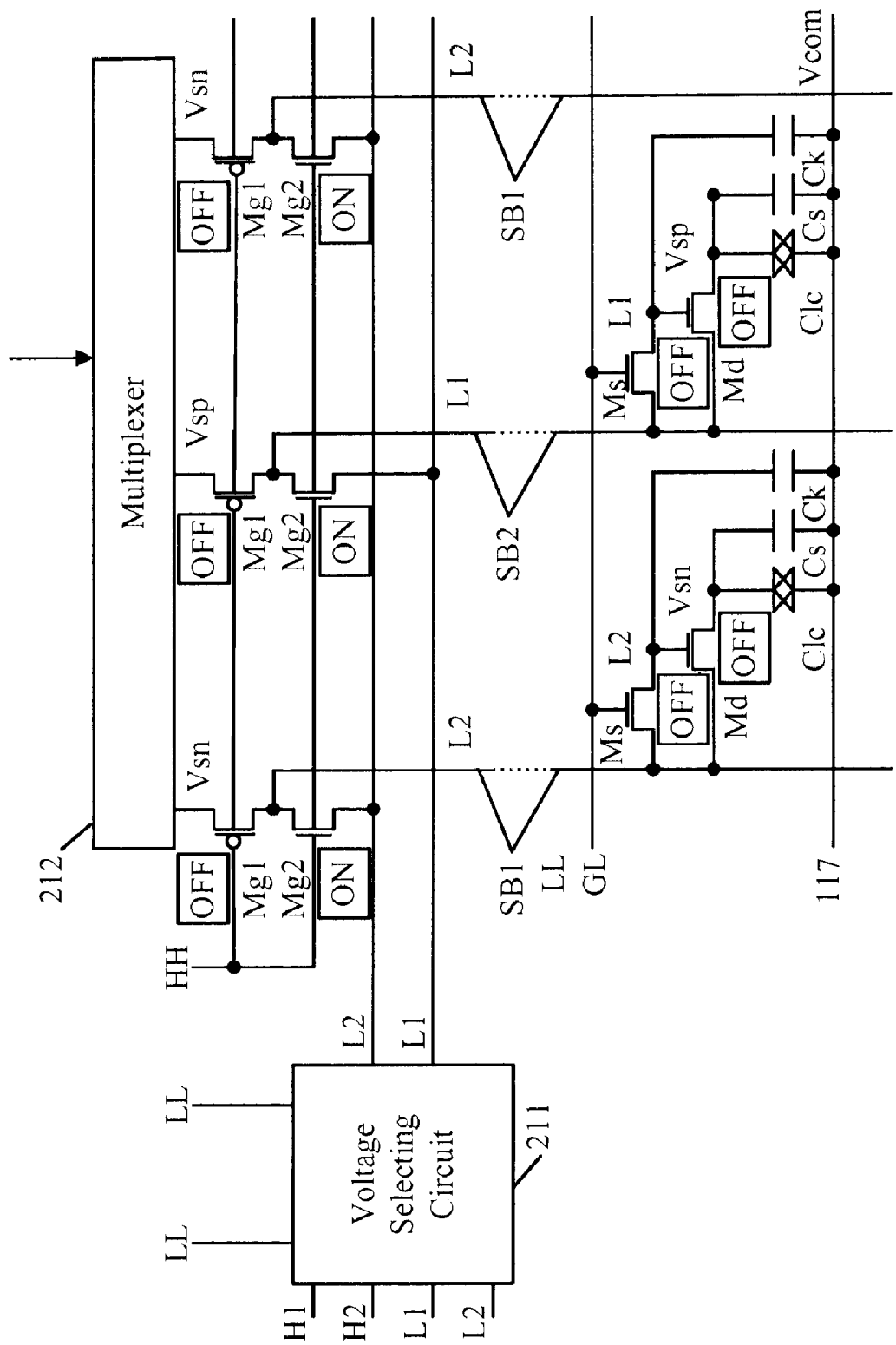
FIG. 5 shows a block circuit diagram of the display device in an initial status according to the present invention.

Because the voltage levels of the gate lines GL are changed from high level HH to low level LL, the gate voltage control transistors Ms are turned off and the display device is recovered back to the initial status therewith as shown in FIG. 5. Furthermore, a more detailed explanation of the aforesaid operations with a timing diagram is presented in the following.

Figure 14:
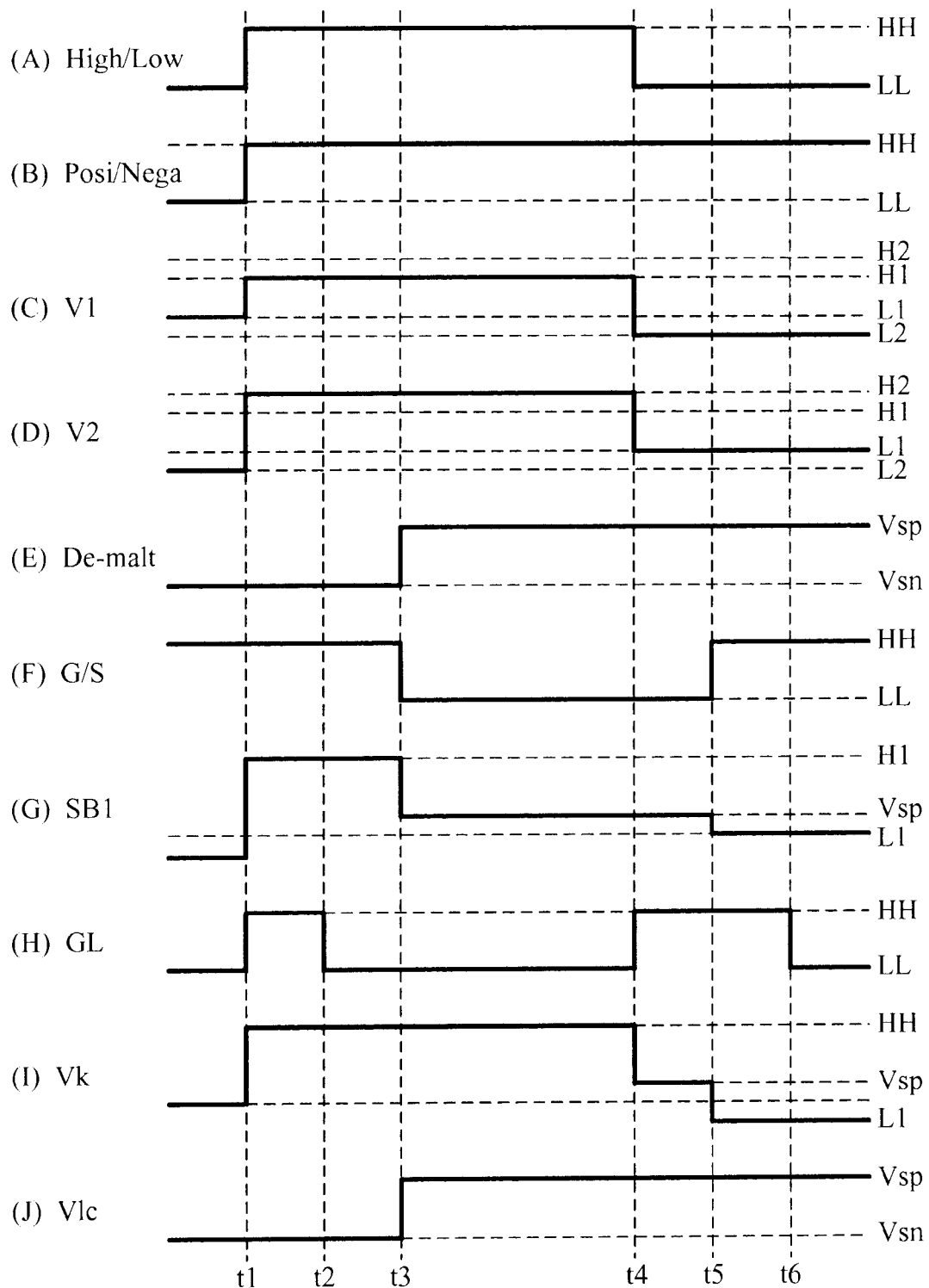
FIG. 14 shows a timing diagram of the write operation to the pixel according to the present invention.

Please refer to FIG. 14, which shows a timing diagram of the write operation to the pixel according to an embodiment. FIG. 14(A) is a waveform of the driving voltage level indicating signal high/low. FIG. 14(B) is a waveform of the bus indicating signal posi/nega. FIG. 14(C) is a waveform of the first output voltage V1 from the voltage selecting circuit 211.

FIG. 14(D) is a waveform of the second output voltage V2 from the voltage selecting circuit 211. FIG. 14(E) is a waveform of the output voltage from the multiplexer 212. FIG. 14(F) is a waveform of the switching signals gate/source. FIG. 14(G) is a waveform of the output voltage of the first source bus line SB1. FIG. 14(H) is a waveform of the gate lines GL. FIG. 14(I) is a waveform of the voltage Vk of the capacitor Ck. FIG. 14(J) is a waveform of an applied voltage Vlc to the capacitor Cle.

At the moment t1 and with the driving voltage level indicating signal high/low and the bus indicating signal posi/nega from the controller 102 shown in FIG. 3, the voltage levels of the gate lines are changed from low level LL to high level HH in the initial status. The first output voltage V1 from the voltage selecting circuit 211 becomes the first high level voltage H1, and the second output voltage V2 becomes the second high level voltage H2. Therefore, the first source bus lines SB1 become at the first high level voltage H1. Besides, with the voltage levels of the gate lines GL changed to high level HH, the gate voltage control transistors Ms are turned on and the capacitors Ck are applied with the first high level voltage H1.

At the moment t2, when the controller 102 changes the voltage levels of the gate lines GL to low level LL, the gate voltage control transistors Ms are turned off and the capacitors Ck are held with the first high level voltage H1.

Then, at the moment t3, when the controller 102 changes the voltage levels of the switching signals gate/source to low level LL, the output voltage of the multiplexer 212 is changed from Vsn to Vsp and the voltage of the first source bus lines SB1 becomes Vsp. Moreover, the pixel driving transistors Md are turned on and the capacitors Clc are applied with the voltage Vsp from the first source bus lines SB1.

Then, at the moment t4, when the controller 102 changes the voltage levels of the driving voltage level indicating signals high/low to low level LL and the voltage levels of the gate lines GL to high level HH, the first output voltage V1 from the voltage selecting circuit 211 becomes the second low level voltage L2 and the second output voltage V2 becomes the first low level voltage L1. Moreover, with the voltage levels of the gate lines GL changed to high level HH, the gate voltage control transistors Ms are turned on and the capacitors Ck are applied with the voltage Vsp.

At the moment t5, when the controller 102 changes the voltage levels of the switching signals gate/source to high level HH, the first source bus lines SB1 become at the first low level voltage L1 and the capacitors Ck are applied with the first low level voltage L1.

At the moment t6, when the controller 102 changes the voltage levels of the gate lines GL to low level LL, the gate voltage control transistors Ms are turned off and the capacitors Ck are held with the first low level voltage L1 to recover the display device back to the initial status.

As aforementioned, the gate voltages of the pixel driving transistors Md can be changed to the first, second high level voltages H1, H2 and the first, second low level voltages L1, L2 with the gate voltage control transistors Ms. Therefore, the alteration of the off-status currents of the pixel driving transistors Md between the first liquid crystal driving status and the second liquid crystal driving status can be diminished.

Figure 15:
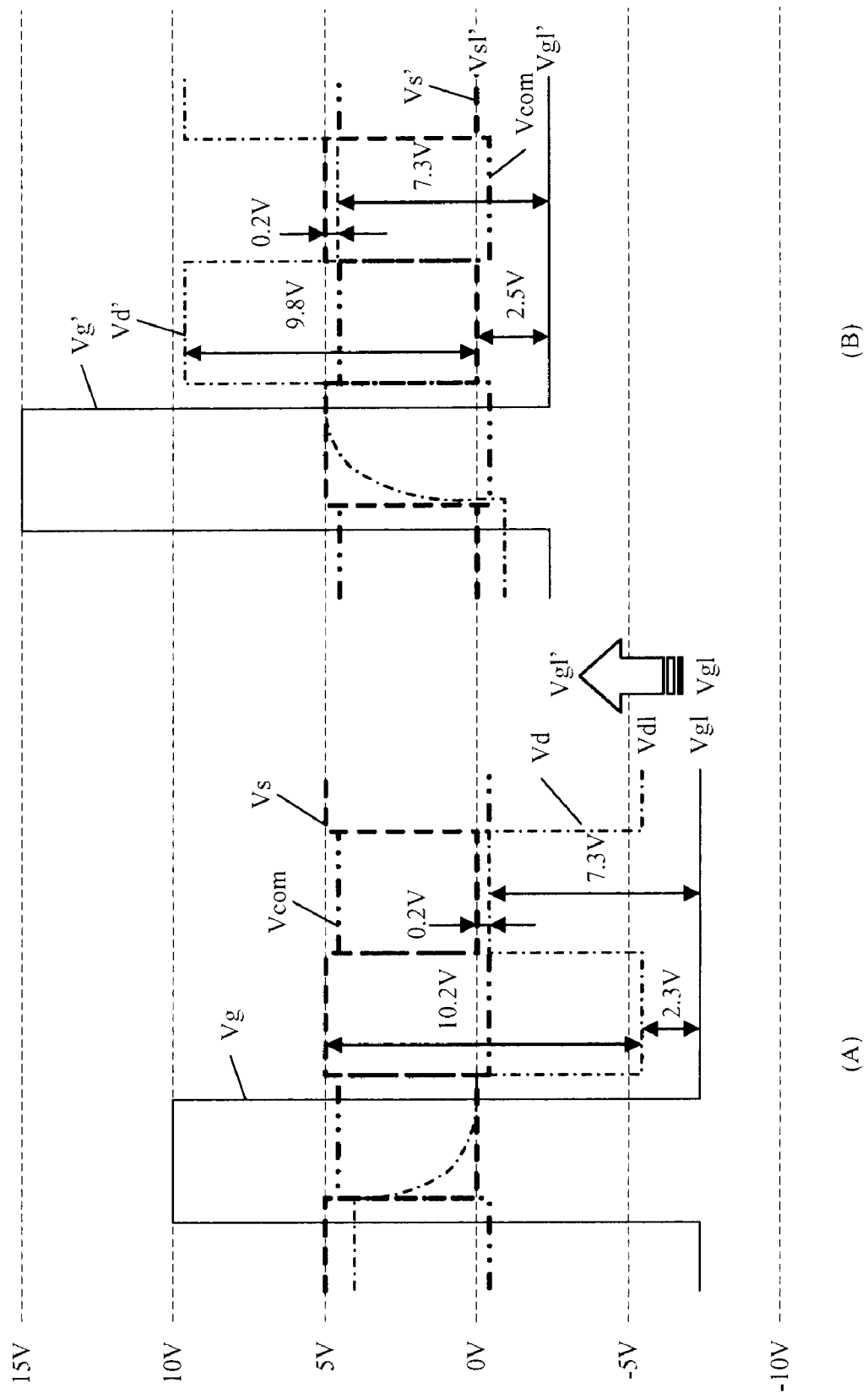
FIG. 15 depicts waveforms of the operation to the pixel driving transistor Md.
Figure 16:
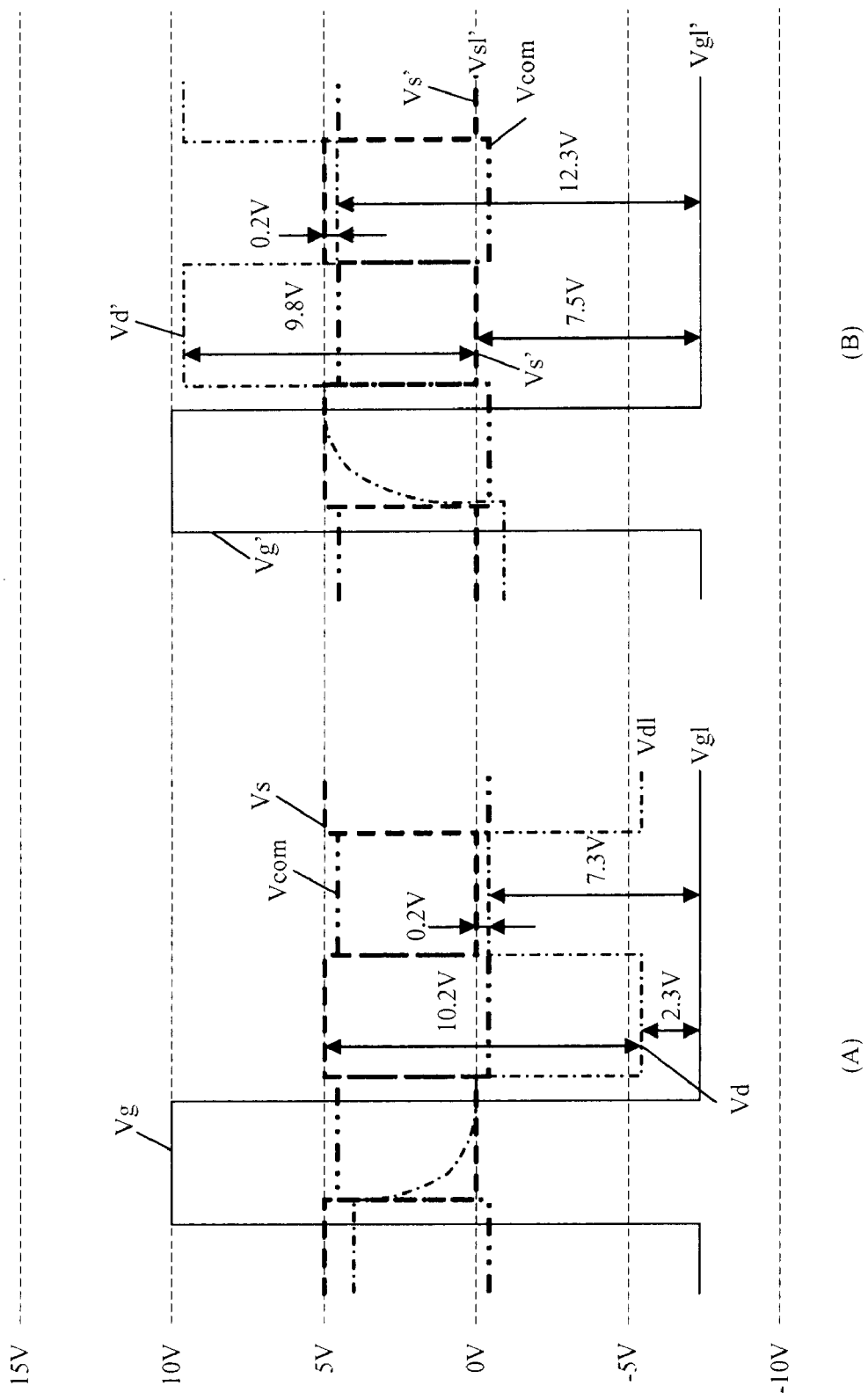
FIG. 16 shows waveforms of a gate lines driving method of an embodiment according to prior arts.

Please refer to FIG. 15, which depicts waveforms of the operations to the pixel driving transistors Md. FIG. 15(A) shows waveforms of the first liquid crystal driving status and FIG. 15(B) shows waveforms of the second liquid crystal driving status. The solid lines represent gate voltages Vg, Vg'. The dotted lines represent source voltages Vs, Vs'. The one-dot chain lines represent drain voltages Vd, Vd'. The two-dot chain lines represent common voltage Vcom which is applied to the common electrode 117.

In the voltage selecting circuit 211 of this embodiment, the gate voltage Vg of the pixel driving transistor Md in the first liquid crystal driving status as shown in FIG. 15(A), is approximately +10 V~−7.5V. In the second liquid crystal driving status as shown in FIG. 15(B), the gate voltage Vg' is approximately +15V~−2.5V. Comparing the first liquid crystal driving status shown in FIG. 15(A) with the second liquid crystal driving status shown in FIG. 15(B), a voltage difference (2.3V) exists between the base voltage Vgl of the gate voltage Vg and the base voltage Vdl of the drain voltage Vd, and the voltage difference (2.5V) exists between the base voltage Vgl' of the gate voltage Vg' and the base voltage Vsl' of the source voltage Vs'. The voltage difference between the first liquid crystal driving status and the second liquid crystal driving status can be diminished to be 0.2V approximately. Consequently, the off-status current in the second liquid crystal driving status can be decreased. Furthermore, the alteration of the off-status currents between the first liquid crystal driving status and the second liquid crystal driving status can be diminished and accordingly, the flicker phenomenon can be reduced.

Moreover, the LCD apparatus 100 of the aforesaid embodiment can be utilized in computers, televisions or other electronic apparatus. The aforesaid electronic apparatus can be further utilized for electronic systems, such as, information process systems.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An LCD device having pixel electrodes and pixel driving transistors, each of the pixel driving transistor having a drain coupled to the pixel electrode and a source coupled to a source bus, the pixel driving transistor controlling a voltage applied to the pixel electrode according to a gate voltage applied to a gate thereof, the LCD device comprising:

a capacitor coupled to the gate of the pixel driving transistor for holding the voltage at the gate of the pixel driving transistor;

a gate voltage control transistor having a drain coupled to a connection point between the gate of the pixel driving transistor and the capacitor, a source coupled to the source bus and a gate coupled to a gate line, for controlling the voltage applied to the capacitor; and a source driving circuit utilizing adjacent source bus lines to alternately switch the voltage held by the capacitor among several different high voltages or several different low voltages to drive the source of the pixel driving transistor.

2. The LCD device of claim 1, wherein the source driving circuit further comprises:
   a multiplexer, providing a source voltage of the pixel electrode to the source bus;
   a first high voltage source, generating a first high level voltage;
   a second high voltage source, generating a second high level voltage, which is higher than the first high level voltage;
   a first low voltage source, generating a first low level voltage, which is lower than the first and second high level voltages;
   a second low voltage source, generating a second low level voltage, which is lower than the first low level voltage;
   a voltage selecting circuit, selectively outputting one of the first high level voltage and the second high level voltage to a first output line, and one of the first low level voltage and the second low level voltage to a second output line according to a selection signal; and
   a voltage switching circuit, providing the voltages outputted by the first output line and the second output line to the source bus when the voltage applied to the capacitor is held and alternately providing outputs of the multiplexer to the source bus when the source voltage is applied to the source of the pixel driving transistor.

3. The LCD device of claim 2, wherein the voltage selecting circuit further comprises:
   a first voltage level selecting unit, outputting the first high level voltage or the second high level voltage, the first low level voltage or the second low level voltage according to a voltage level selecting signal;
   a second voltage level selecting unit, outputting the second high level voltage or the first high level voltage, the second low level voltage or the first low level voltage according to the voltage level selecting signal;
   a third voltage level selecting unit, outputting one of the first high level voltage and the second high level voltage, as well as one of the first low level voltage and the second low level voltage from the first voltage selecting unit to first source bus lines according to a source bus switching signal; and
   a fourth voltage level selecting unit, outputting either the second high level voltage or the first high level voltage, as well as either the second low level voltage or the first low level voltage from the second voltage selecting unit to second source bus lines which are adjacent to the first source bus lines according to the source bus switching signal, wherein the first and second source bus lines are alternatively arranged.

4. An electronic apparatus, comprising the LCD device of claim 1.

5. An electronic system, comprising the electronic apparatus of claim 4.

* * * * *